United States Patent
Park

[11] Patent Number: 5,793,834
[45] Date of Patent: Aug. 11, 1998

[54] METHOD FOR DETECTING POSITION OF LINEAR STEPPING MOTOR AND APPARATUS THEREFOR

[75] Inventor: In-oh Park, Changwon, Rep. of Korea

[73] Assignee: Samsung Aerospace Industries, Ltd., Kyongsangnam-Do, Rep. of Korea

[21] Appl. No.: 707,956

[22] Filed: Sep. 10, 1996

[30] Foreign Application Priority Data

Sep. 12, 1995 [KR] Rep. of Korea ................ 1995-29689

[51] Int. Cl.$^6$ ............................................ G01M 3/00
[52] U.S. Cl. ............................................ 377/17
[58] Field of Search ............................................ 377/17, 16

[56] References Cited

U.S. PATENT DOCUMENTS

| | | | |
|---|---|---|---|
| 5,317,614 | 5/1994 | Davis et al. | 377/17 |
| 5,425,073 | 6/1995 | Bitzer et al. | 377/17 |

*Primary Examiner*—Margaret Rose Wambach
*Attorney, Agent, or Firm*—Finnegan, Henderson, Farabow, Garrett & Dunner, L.L.P.

[57] ABSTRACT

A method for detecting the position of a linear stepping motor which includes the steps of generating a reference clock signal for detecting the position of the linear stepping motor using an oscillator and counting the reference clock signal with a counter, generating digital values of carrier sine waves $\sin\omega t$ and $\cos\omega t$ by inputting the output of the counter to a ROM having sine and cosine functions, converting the digital values of the carrier sine waves $\sin\omega t$ and $\cos\omega t$ to analog sine wave signals $\sin\omega t$ and $\cos\omega t$ using a digital-to-analog converter and outputting the result, generating the signals $\sin\omega t\cos\theta$ and $\cos\omega t\sin\theta$ by multiplying the analog sine wave signals $\sin\omega t$ and $\cos\omega t$ by sine wave signals $\sin\theta$ and $\cos\theta$ from a linear scale in a multiplier, adding the signals $\sin\omega t\cos\theta$ and $\cos\omega t\sin\theta$ in an adder to form a modulated signal $\sin(\omega t+\theta)$, converting the a modulated signal $\sin(\omega t+\theta)$ to a predetermined square wave signal in a comparator so as to be synchronized with the counter, and detecting the phase difference between the square wave signal from the comparator and the sine wave signal $\sin\omega t$ to detect the position of the linear stepping motor. The reference sine wave and square wave signals are compared twice in one period and the displacement of the linear stepping motor is detected in real time by being synchronized with the reference sine wave.

5 Claims, 3 Drawing Sheets

METHOD FOR DETECTING POSITION OF LINEAR STEPPING MOTOR AND APPARATUS THEREFOR

BACKGROUND OF THE INVENTION

The present invention relates to a linear stepping motor, and more particularly, to a method and apparatus for precisely detecting the position of a linear stepping motor by supplying linear scale information to a main control unit.

Generally, a linear motor is an electric motor exhibiting rectilinear motion and whose fundamental operating principle is similar to that of an induction motor. Namely, in an induction motor, a revolving magnetic field is generated in a stator winding by an AC power supply and an electric current flowing through a rotor winding generates a force according to Fleming's left-hand rule, thus rotating the rotor. A linear motor, however, uses a rectilinear magnetic field instead of the revolving magnetic field, inducing rectilinear motion instead of revolving motion.

A linear stepping motor is a modification of the linear motor in which the principles of a stepping motor are applied. Namely, the stepping motor principle is provided by polyphase windings installed in the stator and a mover having protruding poles whose pitch is a little out of joint with a stator core. The mover is moved rectilinearly by a certain distance corresponding to an electric pulse by drawing the protruding poles as the polyphase windings installed in the stator are excited.

Conventionally, in order to detect the position of the mover in such a linear stepping motor, a method is adopted which equates a pitch of the linear scale to a period of the electric pulse and multiplies position information in the pitch of the linear scale by the phase information of a carrier signal. In particular, a phase-modulated signal $V_{sen}$ is generated by synthesizing position information signals $\sin\theta$ and $\cos\theta$, obtained from a sensor, with carrier signals $\sin\omega t$ and $\cos\omega t$, whose angular frequency is $\omega$. Thus, $V_{ref}=\sin\omega t$ and $V_{sen}=\sin\omega t\cos\theta+\cos\omega t\sin\theta=\sin(\omega t+\theta)$ Here, the phase difference $\theta$ between a reference carrier signal $V_{ref}$ and a synthesized signal $V_{sen}$ denotes a displacement quantity of the linear stepping motor. The position information of the mover is obtained by processing the phase difference. According to such conventional technology, signal information obtained with, for example, a scale of 20 μm are then multiplied 100 times, indicating that the displacement quantity of the linear stepping motor is detected with a resolution of 0.2 μm. This will be described in more detail with reference to FIGS. 1A and 1B.

According to the conventional technology, the displacement $\theta$ of the linear stepping motor is determined by supplying 100 clock pulses in one period. Here, the signals of the scale obtained per 20 μm pitch are counted using a separate counter. For the signals less than 20 μm, a clock having a frequency of 100 ωt is counted by a counter as shown in FIG. 1A. At this time, a method for resetting the counter with a pulse A and latching the counter with a pulse B applied to a latch portion is repeatedly used. The value latched by such a method becomes the displacement quantity $\theta$ of the linear stepping motor, which is less than 20 μm. The total displacement is obtained by synthesizing the latched value with a separate counter value counted by a CPU every 20 μm.

Such a conventional method has shortcomings in that position detection is relatively imprecise because only a rising edge of the signals $\sin\omega t$ and $\sin(\omega t+\theta)$ are compared as shown in FIG. 1B and because it is impossible to detect displacement during high speed operation without latching the counter with the pulse B.

SUMMARY OF THE INVENTION

It is an object of the present invention to provide a method and apparatus for precisely detecting the position of a linear stepping motor. It is a further object of the present invention to provide a method and apparatus for detecting displacement during high speed operation by reading a clock signal used for detecting the displacement of the linear stepping motor during every period of a carrier signal and for improving precision of the detection by comparing falling edges and rising edges of the respective signals.

To achieve the above objects, there is provided a method according to the present invention for detecting the position of a linear stepping motor, comprising the steps of generating a reference clock signal for detecting the position of the linear stepping motor using an oscillator, counting the reference clock signal with a counter and generating an output, generating digital values of carrier sine waves $\sin\omega t$ and $\cos\omega t$ by inputting the output of the counter to a ROM having sine and cosine functions, converting the digital values of the $\sin\omega t$ and $\cos\omega t$ to analog sine wave signals of $\sin\omega t$ and $\cos\omega t$ using a digital-to-analog converter and outputting the analog line wave signals, generating in a multiplier the signals $\sin\omega t\cos\theta$ and $\cos\omega t\sin\theta$ by multiplying the analog sine wave signals $\sin\omega t$ and $\cos\omega t$ by sine wave signals $\cos\theta$ and $\sin\theta$, respectively, from a linear scale, adding the signals $\sin\omega t\cos\theta$ and $\cos\omega t\sin\theta$ in an adder to form a modulated signal $\sin(\omega t+\theta)$, converting the modulated signal $\sin(\omega t+\theta)$ to a predetermined square wave signal in a comparator so as to be synchronized with the counter and outputting the predetermined square wave signal, and detecting the phase difference between the predetermined square wave signal from the comparator and the sine wave signal $\sin\omega t$ to detect the position of the linear stepping motor.

To achieve the above objects, there is also provided an apparatus according to the present invention for detecting the position of a linear stepping motor, comprising an oscillator for generating a predetermined reference clock signal for detecting the position of the linear stepping motor, a counter for the reference clock signal which generates a reference clock signal output, a plurality of ROMs for converting the reference clock signal output from the counter to digital values of carrier sine waves $\sin\omega t$ and $\cos\omega t$ and outputting the digital values, a digital-to-analog converter for converting the digital values of the carrier sine waves $\sin\omega t$ and $\cos\omega t$ from the ROM to the analog sine wave signals $\sin\omega t$ and $\cos\omega t$ and outputting the analog sine wave signals, a multiplier for multiplying the analog sine wave signals $\sin\omega t$ and $\cos\omega t$ by sine wave signals $\cos\theta$ and $\sin\theta$, respectively, from a linear scale and outputting the signals $\sin\omega t\cos\theta$ and $\cos\omega t\sin\theta$, an adder for adding the signals $\sin\omega t\cos\theta$ and $\cos\omega t\sin\theta$ from the multiplier and outputting a signal $\sin(\omega t+\theta)$, a comparator for converting the signal $\sin(\omega t+\theta)$ to a predetermined square wave signal and outputting the predetermined wave signal, and a position detecting circuit for detecting the position of the linear stepping motor by detecting the phase difference between the square wave signal from the comparator and the sine wave $\sin\omega t$.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

The following description explains the detection of the displacement quantity of a linear stepping motor having a resolution of 0.15625 μm by multiplying 128 times the signal obtained from a scale of 20 μm pitch.

Figure 1A:
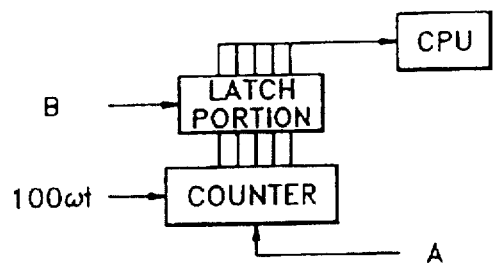
FIG. 1A is a block diagram showing a conventional method for detecting the position of a linear stepping motor.
Figure 1B:
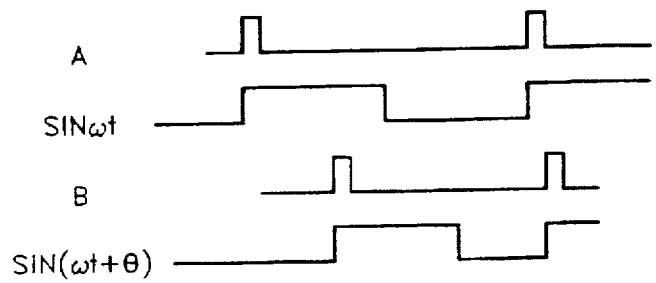
FIG. 1B is a timing diagram of input and output signals for the system of FIG. 1A.
Figure 2:
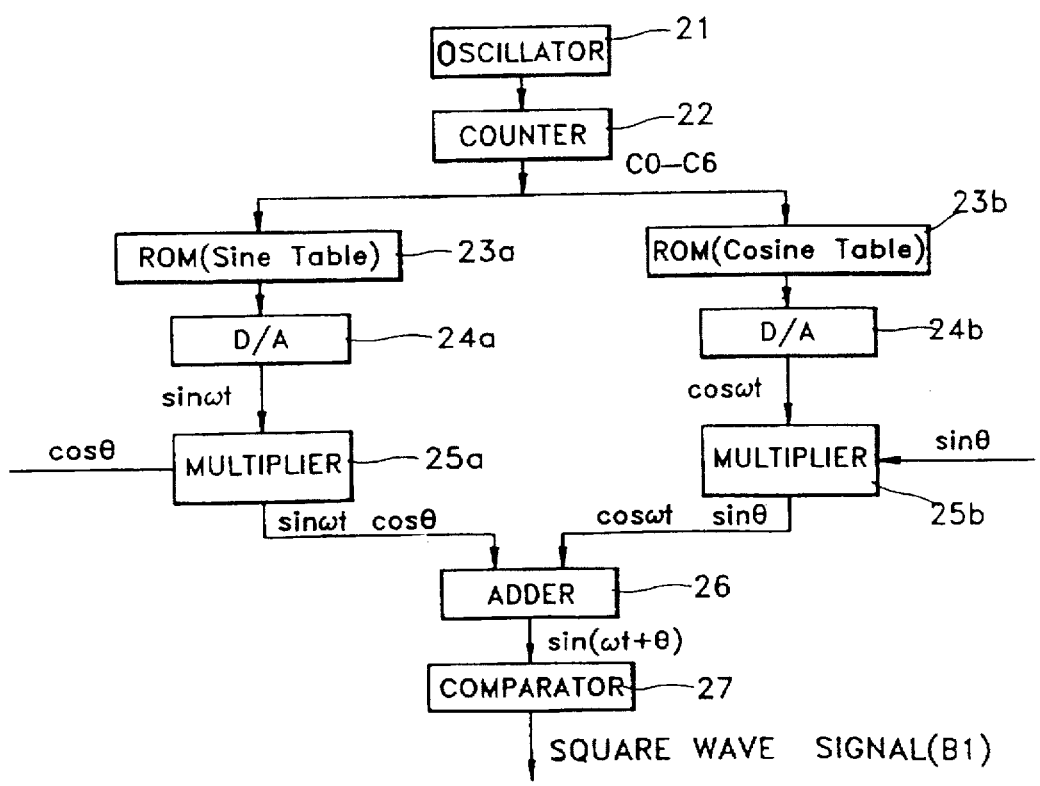
FIG. 2 is a block diagram of a phase modulating portion of a position detecting apparatus for a linear stepping motor according to the present invention.

Referring to FIG. 2, a reference clock signal having a predetermined frequency, for example, 16 MHz, is generated by an oscillator 21 to detect the position of the linear stepping motor. The reference clock signal is counted by a 7-bit counter 22. The outputs C0–C6 of the counter 22 are respectively input to a first ROM 23a having a sine function and a second ROM 23b having a cosine function. The first and second ROMs 23a and 23b, respectively, generate the digital values sinωt and cosωt. The digital values sinωt and cosωt are input to first and second digital-to-analog converters 24a and 24b, respectively, and converted to the analog sine wave signals sinωt and cosωt. The analog sine wave signals sinωt and cosωt are respectively input to first and second multipliers 25a and 25b.

Signals cosθ and sinθ from a linear scale are also input to first and second multipliers 25a and 25b, respectively, through another route and modulated to form the signals sinωtcosθ and cosωtsinθ, respectively. The modulated signals sinωtcosθ and cosωtsinθ are input to an adder 26, which forms a synthesized signal sin(ωt+θ) by adding the two input signals sinωtcosθ and cosωtsinθ. The synthesized signal sin(ωt+θ) is output as a square wave signal B1 (refer to FIG. 4) having a predetermined pattern after passing through a comparator 27. This is a phase modulation step. The next step, detecting the position of the linear stepping motor, proceeds on the basis of the square wave signal B1 obtained in the phase modulation step.

Figure 3:
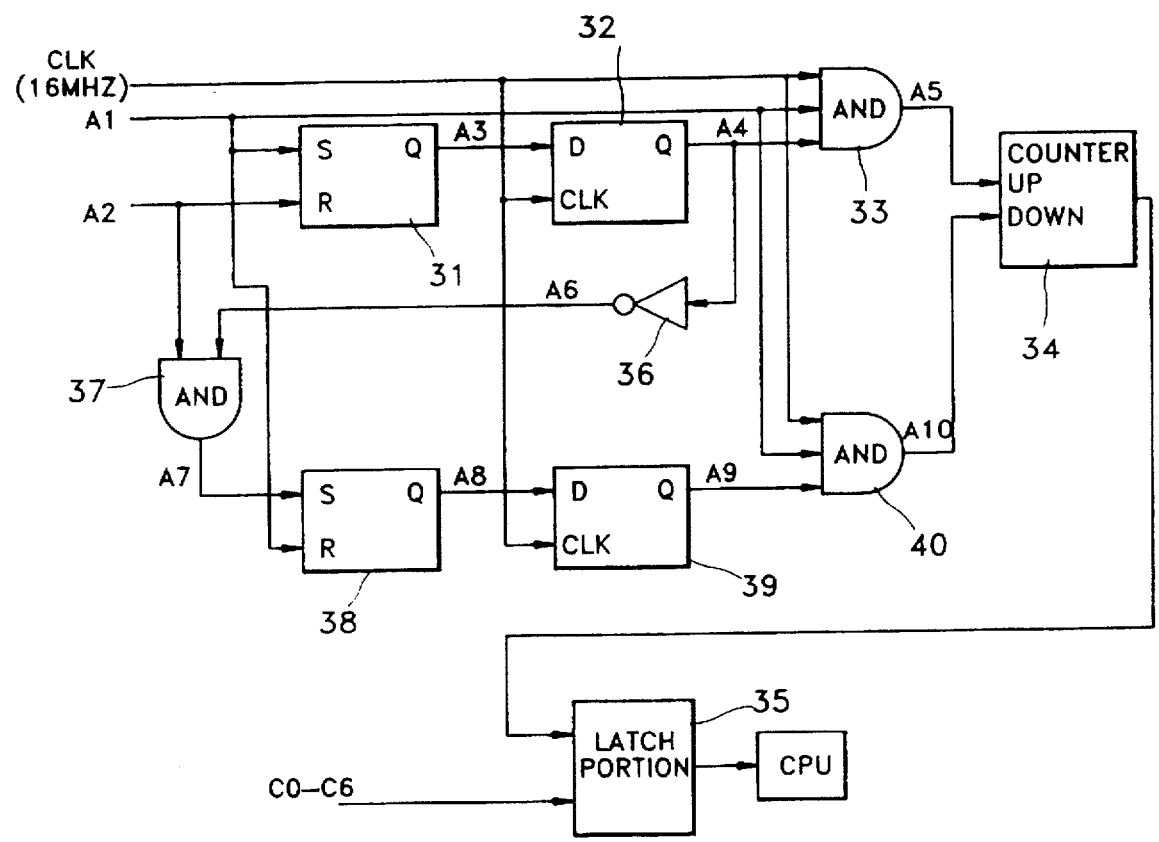
FIG. 3 is a block diagram of a position detecting portion of a position detecting apparatus for a linear stepping motor according to the present invention.
Figure 4:
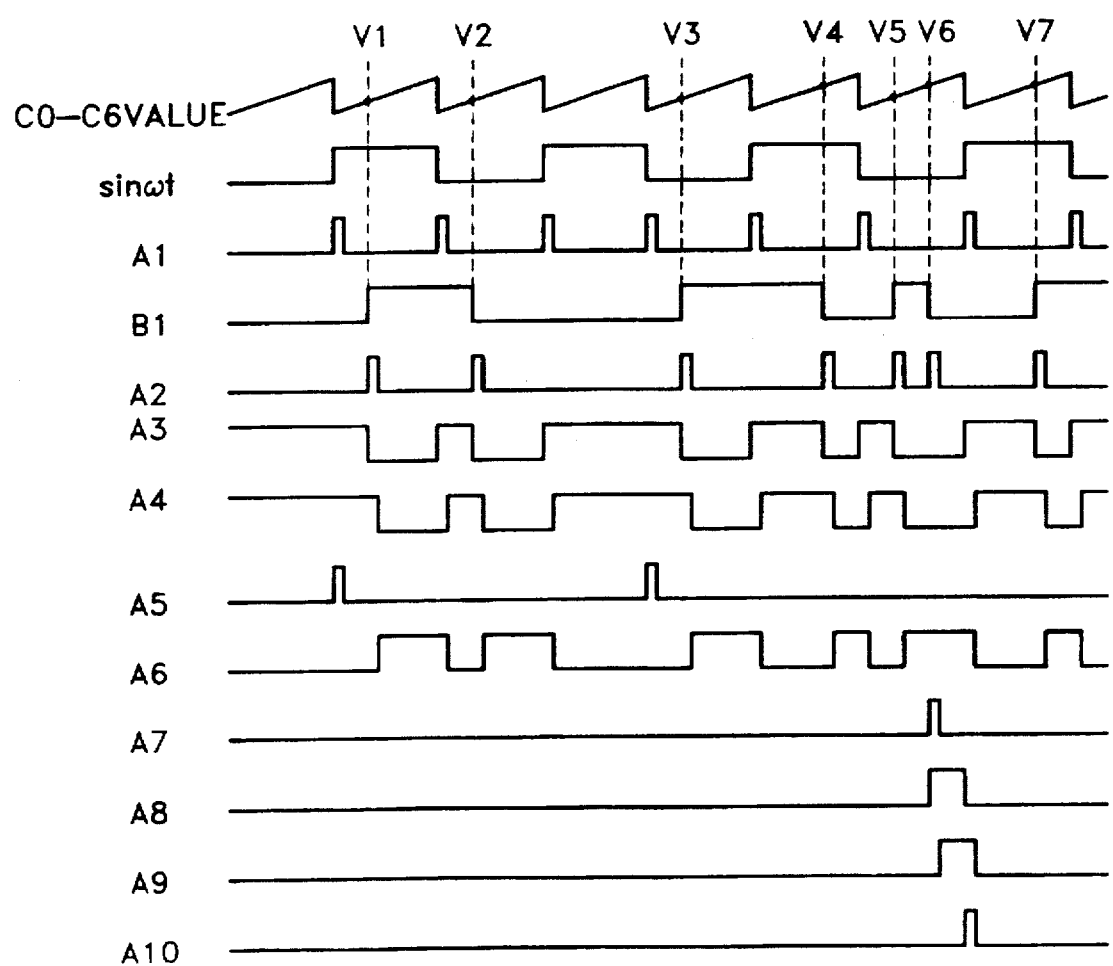
FIG. 4 is a timing diagram of the input and output signals for the position detecting portion of FIG. 3.

FIG. 3 is a block diagram of a phase difference detecting portion and a position detecting portion of the position detecting apparatus for the linear stepping motor according to the present invention. FIG. 4 is a timing diagram of the input and output signals for the position detecting portion of FIG. 3.

Referring to FIGS. 3 and 4, a pulse A1 formed by detecting a zero-crossing point of the reference sine wave sinωt and a pulse A2 formed by detecting an edge of the square wave signal B1 obtained in the phase modulation step of FIG. 2 are input to a first S-R flip-flop 31. The pulse A1 sets the output pulse A3 of the first S-R flip-flop 31 as 1 and the pulse A2 resets the output pulse A3 of the first S-R flip-flop 31 as 0. The output pulse A3 and the reference clock CLK output from the oscillator 21 of FIG. 2 are input to a first D flip-flop 32. The first D flip-flop 32 outputs a pulse A4 which is delayed by 1 pulse when synchronizing the output pulse A3 with the reference clock CLK. The pulse A1 and output pulse A4 are synchronized with the reference clock CLK and input to a first AND gate 33 from which a predetermined pulse A5 is output as a logical product and input to an up/down counter 34. A pulse of the predetermined pulse A5 corresponds to a displacement of 10 μm of the linear stepping motor.

The output pulse A4 is also input to an inverter 36 and output as an inverted pulse A6. The pulse A2 and inverted pulse A6 are input to a second AND gate 37, from which a predetermined pulse A7 is output as a logical product. The predetermined pulse A7 and pulse A1 are input to a second S-R flip-flop 38. Here, the predetermined pulse A7 sets an output pulse A8 of the second S-R flip-flop 38 as 1 and the pulse A1 resets the output pulse A8 of the second S-R flip-flop 38 as 0. The output pulse A8 and the reference clock CLK are input to a second D flip-flop 39. The second D flip-flop 39 outputs a pulse A9 which is delayed by 1 pulse upon synchronizing the output pulse A8 with the reference clock CLK. The pulse A1 and output pulse A9 are synchronized with the reference clock CLK and input to a third AND gate 40, from which a predetermined pulse A10 is output as a logical product and input to the up/down counter 34. A pulse of the predetermined pulse A10 corresponds to a displacement of −10 μm of the linear stepping motor. Here, a minus sign (−) indicates movement in the opposite direction. Furthermore, the first and third AND gates 33 and 40 each generate a predetermined pulse when the phase difference between the reference sine wave sinωt and the square wave signal B1 is more than 180°.

Also, movements of less than 10 μm become the values V1, V2, V3, V4, V5, V6, and V7 of the outputs of the counter 22 (Refer to FIG. 2.) when the pulse A2 is generated. In addition, the result of adding the value V3, for example, to the value of the up/down counter 34 which separately counts the predetermined pulses A5 and A10 becomes the displacement of the linear stepping motor at that moment.

The up/down counter 34 counts the number of predetermined pulses A5 and A10. The output signal produced by the up/down counter 34 and the output signals of the counter 22 of FIG. 2 (C0–C6 which are counted from 0 to 6 and are twice the frequency of the reference sine wave sinωt formed by being synchronized with the counter 22) are latched in the latch portion 35 and transferred to the CPU which totally controls the system.

Based on this procedure, the phase difference between the reference sine wave sinωt and the square wave signal B1 is more than 180° when there are two edges of the reference sine wave sinωt in a half-period of the square wave signal B1 obtained in the phase modulation step of FIG. 2. The predetermined pulse signal A5 is formed at this moment. The phase difference of 180° means 10 μm since the sine wave signal of one period is obtained every 20 μm from the scale. Similarly, the phase difference between the reference sine wave sinωt and the square wave signal B1 is more than −180° when there are two edges of the reference sine wave sinωt in a half-period of the square wave signal B1.

The predetermined pulse signal A10 is formed at this moment.

Here, the phase difference of −180° means −10 μm. Therefore, regardless of the speed, it is possible to precisely detect the displacement of the linear stepping motor for every period of the reference sine wave sinωt by counting the number of predetermined pulses A5 and A10 input to the up/down counter 34 and added to the output values C0–C6 of the counter 22 of FIG. 2.

Also, the relation between the number of bits of the counter and the frequency of the input pulses is changed. When the counter is an n-bit counter and the frequency of the reference sine wave sinωt is F, the frequency f of the counter is expressed as follows.

$$f = 2 \times F \times 2^n$$

For example, when a 6-bit counter is used and the frequency F of the reference sine wave sinωt is 125 kHz, the frequency f of the input clock signal of the counter becomes 16 MHz.

As a result, the displacement of the linear stepping motor is detected by comparing the reference sine wave with the square wave signal twice in one period in the method according to the present invention, as compared to only once in one period in the conventional method, thus improving the precision of detecting the displacement of the linear stepping motor. Also, according to the method of the present invention, it is possible to detect the displacement of the linear stepping motor in real time by being synchronized with the reference sine wave sinωt, and to detect the displacement during high speed operation.

Also, it is clearly understood that the above position detecting method can be applied to a general rotation type motor by anyone skilled in the art.

What is claimed is:

1. A method for detecting the position of a linear stepping motor, comprising the steps of:

generating a reference clock signal for detecting the position of the linear stepping motor using an oscillator and counting the reference clock signal with a counter, the counter producing an output;

generating digital values of carrier sine waves sinωt and cosωt by inputting the output of the counter to a ROM having sine and cosine functions;

converting the digital values of said carrier sine waves sinωt and cosωt to analog sine wave signals sinωt and cosωt using a digital-to-analog converter and outputting the analog sine wave signals;

generating, in a multiplier, signals sinωtcosθ and cosωtsinθ by multiplying said analog sine wave signals sinωt and cosωt by sine wave signals sinθ and cosθ from a linear scale, respectively;

adding said signals sinωtcosθ and cosωtsinθ in an adder to form a modulated signal sin(ωt+θ);

converting said modulated signal sin(ωt+θ) to a predetermined square wave signal in a comparator so as to be synchronized with said counter and outputting the predetermined square wave signal; and detecting the phase difference between the predetermined square wave signal from said comparator and the sine wave signal sinωt to detect the position of the linear stepping motor.

2. A method for detecting the position of a linear stepping motor as claimed in claim 1, wherein a value of the counter is read upon the occurrence of each edge of said sine wave sinωt and the predetermined square wave signal in the phase difference detecting step.

3. An apparatus for detecting the position of a linear stepping motor, comprising:

an oscillator for generating a predetermined reference clock signal;

a counter coupled to the oscillator and receiving the reference clock signal, said counter generating a reference clock signal output;

a plurality of ROMs coupled to the counter for converting the reference clock signal output from said counter to digital values of carrier sine waves sinωt and cosωt and outputting the digital values;

a digital-to-analog converter coupled to the ROMs and converting the digital values of the carrier sine waves sinωt and cosωt to analog sine wave signals sinωt and cosωt;

a multiplier coupled to the digital-to-analog converter and receiving sine wave signals cosθ and sinθ for multiplying said analog sine wave signals sinωt and cosωt by sine wave signals cosθ and sinθ, respectively, and outputting signals sinωtcosθ and cosωtsinθ;

an adder coupled to the multiplier and adding the signals sinωtcosθ and cosωtsinθ and outputting a signal sin(ωt+θ);

a comparator coupled to the adder and converting said signal sin(ωt+θ) to a predetermined square wave signal; and a position detecting circuit coupled to the comparator and detecting the position of the linear stepping motor by detecting the phase difference between the predetermined square wave signal and the sine wave sinωt.

4. An apparatus as claimed in claim 3, wherein said position detecting circuit comprises:

a first S-R flip-flop receiving first and second pulses and outputting a third pulse;

a first D flip-flop receiving said third pulse and a clock signal and outputting a fourth pulse;

a first AND gate receiving said clock signal, first pulse and fourth pulse and outputting a fifth pulse;

an inverter receiving said fourth pulse and outputting a sixth pulse;

a second AND gate receiving said sixth and second pulses and outputting a seventh pulse;

a second S-R flip-flop receiving said seventh and first pulses and outputting an eighth pulse;

a second D flip-flop receiving said eighth pulse and said clock signal and outputting a ninth pulse;

a third AND gate receiving said ninth and first pulses and said clock signal and outputting a tenth pulse;

an up/down counter receiving said tenth and fifth pulses and counting the number of said tenth and fifth pulses; and a latch portion for latching an output signal from the up/down counter representing the number of pulses counted and the reference clock signal output from said counter and transferring the same to a CPU.

5. An apparatus as claimed in claim 4, wherein said first and third AND gates each generate a predetermined pulse signal when the phase difference between the sine wave sinωt and the square wave signal becomes more than 180°.

* * * * *